(12) United States Patent
Manders et al.

(10) Patent No.: US 6,506,856 B2
(45) Date of Patent: Jan. 14, 2003

(54) TRANSITION METAL CATALYZED POLYMERIZATION OF OLEFINIC MONOMERS IN A WATER-CONTAINING POLYMERIZATION MEDIUM

(75) Inventors: Lambertus Manders, Ludwigshafen (DE); Marc Oliver Kristen, Limburgerhof (DE); Alexander Haunschild, Speyer (DE); Michael Geprägs, Lambsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/729,456

(22) Filed: Dec. 5, 2000

(65) Prior Publication Data

US 2001/0007009 A1 Jul. 5, 2001

(30) Foreign Application Priority Data

Dec. 23, 1999 (DE) .......................... 199 62 744

(51) Int. Cl.[7] .............................. C08F 4/16; C08F 4/44
(52) U.S. Cl. .................. 526/91; 526/160; 526/161; 526/943; 526/347; 526/348.6; 526/335; 526/910; 526/911; 502/152
(58) Field of Search ............................ 526/89, 91, 160, 526/161, 172, 943, 347, 348.6, 335, 910, 911

(56) References Cited

U.S. PATENT DOCUMENTS 5,627,244 A * 5/1997 Sato ........................... 526/92
6,300,450 B1 * 10/2001 Tsujimoto et al. .......... 526/335

FOREIGN PATENT DOCUMENTS

| EP | 0 308 177 | 3/1989 |
| WO | WO 97/17380 | 5/1997 |

OTHER PUBLICATIONS

Angew Chem.Int.Ed. Engl. 1995, 34. No. 11, Halcrow.

* cited by examiner

*Primary Examiner*—David W. Wu
*Assistant Examiner*—R. Harlan
(74) *Attorney, Agent, or Firm*—Keil & Weinkauf

(57) ABSTRACT

Polymers based on monomers having a C—C double bond and/or C—C triple bond are prepared by polymerization of these monomers in the presence of a catalyst system comprising as active constituents a transition metal compound of an early transition metal and, if desired, a cation-forming compound B) and, if desired, further components C), wherein the polymerization mixture contains at least 30% by weight of water.

9 Claims, No Drawings

TRANSITION METAL CATALYZED POLYMERIZATION OF OLEFINIC MONOMERS IN A WATER-CONTAINING POLYMERIZATION MEDIUM

The present invention relates to a process for preparing polymers based on monomers having a C—C double bond and/or C—C triple bond by polymerization of these monomers in the presence of a catalyst system comprising as active constituents A) a transition metal compound of an early transition metal (M-II)

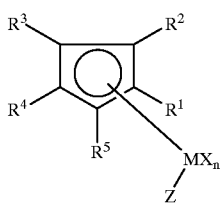

where the substituents and indices have the following meanings:

M is titanium, zirconium, hafnium, vanadium, niobium or tantalum, or an element of transition group III of the Periodic Table and the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, $N(CH_2CH_2O)_3$, n is an integer from 1 to 3 corresponding to the valence of M minus 2, where $R^6$ and $R^7$ are hydrogen, $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^8)_3$ where $R^8$ is $C_1$–$C_{10}$-alkyl, $C_3$–$C_{10}$-cycloalkyl or $C_6$–$C_{15}$-aryl, Z is X or

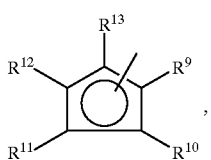

where the radicals $R^9$ to $R^{13}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl and two adjacent radicals may also together form a saturated or unsaturated cyclic group having from 4 to 15 carbon atoms, or $Si(R^{14})_3$ where $R^{14}$ is $C_1$–$C_{10}$-alkyl, $C_6$–$C_{15}$-aryl or $C_3$–$C_{10}$-cycloalkyl, or the radicals $R^4$ and Z together form an —$R^{15}$—A— group, where $R^{15}$ is $R^{15}$ is

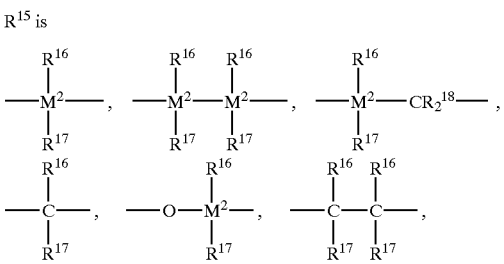

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, where $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them may form a ring, and $M^2$ is silicon, germanium or tin,

A

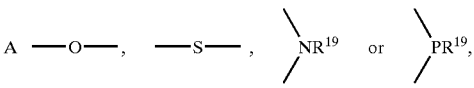

where $R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^4$ and $R^{12}$ together form an —$R^{15}$— group, and, if desired, a cation-forming compound B) and, if desired, further components C), wherein the polymerization mixture contains at least 30% by weight of water.

The present invention also relates to aqueous dispersions or suspensions based on monomers having a C—C double bond and/or C—C triple bond, and polymers obtainable from aqueous dispersions or suspensions by removing the water from these dispersions or suspensions, and also to the use of the aqueous suspensions and/or dispersions.

The polymerization of olefins and vinylaromatic monomers using metallocene catalysts based on early transition metal compounds is known (Angew. Chem. Int. Ed. Engl. 1995, 34, p. 1193).

The polymerizations are customarily carried out with exclusion of water or other protic compounds (compounds having at least one OH group), since these act as poisons toward metallocene catalysts.

Depending on the reaction conditions, it is possible to obtain low molecular weight polymers (dimers, oligomers, waxes) or high molecular weight polymers. Again as a function of the reaction conditions, these are obtained as granular powder or else as very fine powder, which is difficult to handle.

It is an object of the present invention to find a relatively simple polymerization process which gives high molecular weight polymers having a readily handlable particle morphology (for example, free-flowing, high bulk density) or water-containing polymer dispersions.

We have found that this object is achieved by the process defined at the outset, the dispersions or suspensions defined at the outset and the polymers obtainable therefrom.

Particularly well-suited transition metal compounds A) are those containing at least one cyclopentadienyl-type ligand, which are generally referred to as metallocene complexes.

As component A), the catalyst system comprises at least one metallocene complex. Particularly suitable metallocene complexes are those of the formula

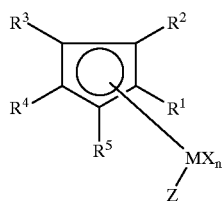

M-II where the substituents and indices have the following meanings:

M is titanium, zirconium, hafnium, vanadium, niobium or tantalum, or an element of transition group III of the Periodic Table and the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, $N(CH_2CH_2O)_3$, n is an integer from 1 to 3 corresponding to the valence of M minus 2, where $R^6$ and $R^7$ are hydrogen, $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^8)_3$, where $R^8$ is $C_1$–$C_{10}$-alkyl, $C_3$–$C_{10}$-cycloalkyl or $C_6$–$C_{15}$-aryl, Z is X or

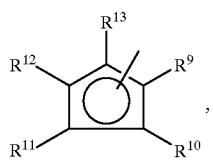

where the radicals $R^9$ to $R^{13}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl and two adjacent radicals may also together form a saturated or unsaturated cyclic group having from 4 to 15 carbon atoms, or $Si(R^{14})_3$, where $R^{14}$ is $C_1$–$C_{10}$-alkyl, $C_6$–$C_{15}$-aryl or $C_3$–$C_{10}$-cycloalkyl, or the radicals $R^4$ and Z together form an —$R^{15}$—A— group, where $R^{15}$ is

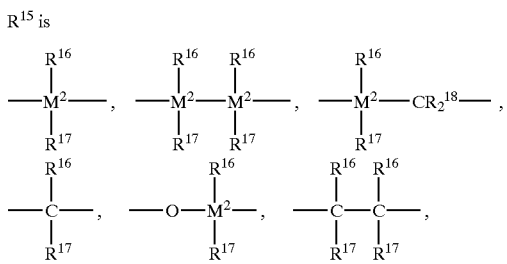

=$BR^{16}$, =$AlR^{16}$, —Ge—, —Sn—, —O—, —S—, =SO, =$SO_2$, =$NR^{16}$, =CO, =$PR^{16}$ or =$p(O)R^{16}$, where $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them may form a ring, and $M^2$ is silicon, germanium or tin,

A

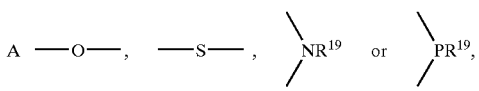

where $R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^4$ and $R^{12}$ together form an —$R^{15}$— group.

Among the metallocene complexes of the formula M-II, preference is given to

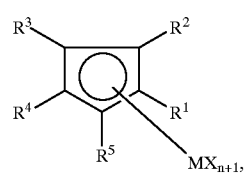

M-IIa

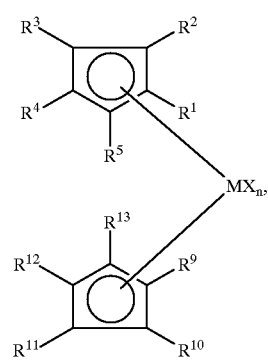

M-IIb

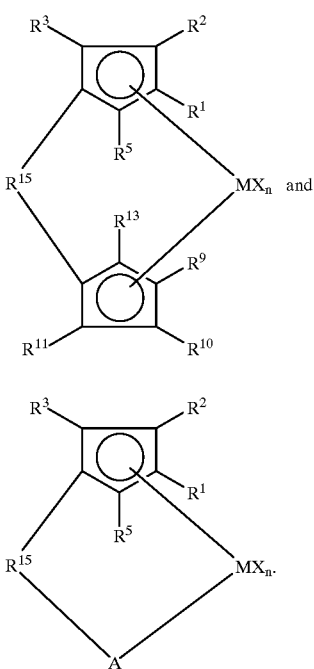

M-IIc

M-IId

The radicals X may be identical or different, but are preferably identical.

Among the compounds of the formula M-IIa, particular preference is given to those in which M is titanium, zirconium or hafnium,
X is chlorine, $C_1$–$C_4$-alkyl, phenyl, $OR^6$,
n is 2 and
$R^1$ to $R^5$ are hydrogen or $C_1$–$C_4$-alkyl.

Very particular preference is given to pentamethylcyclopentadienyltitanium compounds having three alkoxide ligands such as methoxy, ethoxy, tert-butoxy or $N(CH_2CH_2O)_3$, in particular pentamethylcyclopentadienyltitanium trimethoxide.

Among the compounds of the formula M-IIb, preference is given to those in which

M is titanium, zirconium or hafnium,
X is chlorine, $C_1$–$C_4$-alkyl or phenyl, $OR^6$,
n is 2,
$R^1$ to $R^5$ are hydrogen, $C_1$–$C_4$-alkyl or $Si(R^8)_3$,
$R^9$ to $R^{13}$ are hydrogen, $C_1$–$C_4$-alkyl or $Si(R^{14})_3$.

Particularly useful compounds of the formula M-IIb are ones in which the cyclopentadienyl radicals are identical.

Examples of particularly useful compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Particularly suitable compounds of the formula M-IIc are those in which $R^1$ and $R^9$ are identical and are hydrogen or $C_1$–$C_{10}$-alkyl groups,
$R^5$ and $R^{13}$ are identical and are hydrogen or methyl, ethyl, isopropyl or tert-butyl groups, $R^2$, $R^3$, $R^{10}$ and $R^{11}$ have the meanings:
$R^3$ and $R^{11}$ are $C_1$–$C_4$-alkyl
$R^2$ and $R^{10}$ are hydrogen
or two adjacent radicals $R^2$ and $R^3$ and/or $R^{10}$ and $R^{11}$ together form cyclic groups having from 4 to 12 carbon atoms,
$R^{15}$ is

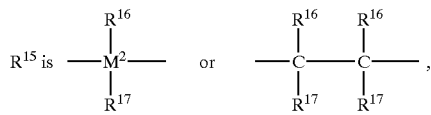

M is titanium, zirconium or hafnium and
$M^2$ is silicon,
X is chlorine, $C_1$–$C_4$-alkyl or phenyl.

Particularly useful compounds of the formula M-IIc are those which bear a $C_6$–$C_{20}$-aryl group in the 4 position and a $C_1$–$C_4$-alkyl group in the 2 position. An example of such a compound of the formula M-IIc is dimethylsilanediylbis(2-methyl-4-phenylindenyl)zirconium dichloride.

The following nomenclature is employed for the site of substitution:

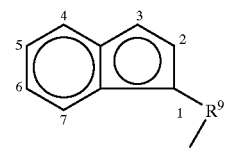

Examples of particularly useful complexes M-IIc are:
dimethylsilanediylbis(indenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyl-4-(1-naphthyl)indenyl) zirconium dichloride
dimethylsilanediylbis(2-methyl-4-(2-naphthyl)indenyl) zirconium dichloride
dimethylsilanediylbis(2-methyl-4-phenylindenyl) zirconium dichloride
dimethylsilanediylbis(2-methyl-4-t-butylindenyl) zirconium dichloride
dimethylsilanediylbis(2-methyl-4-isopropylindenyl) zirconium dichloride
dimethylsilanediylbis(2-methyl-4-ethylindenyl) zirconium dichloride
dimethylsilanediylbis(2-methyl-4-α-acenaphthindenyl) zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl) zirconium dichloride
dimethylsilanediylbis(2-methyl-4,5-benzoindenyl) zirconium dichloride dimethylsilanediylbis(2-methyl-4,6-diisopropylindenyl) zirconium dichloride dimethylsilanediylbis(2-methyl-4,5-diisopropylindenyl) zirconium dichloride dimethylsilanediylbis(2,4,6-trimethylindenyl)zirconium dichloride dimethylsilanediylbis(2,5,6-trimethylindenyl)zirconium dichloride dimethylsilanediylbis(2,4,7-trimethylindenyl)zirconium dichloride dimethylsilanediylbis(2-methyl-5-isobutylindenyl) zirconium dichloride dimethylsilanediylbis(2-methyl-5-t-butylindenyl) zirconium dichloride dimethylsilanediylbis(2-methyl-4-phenanthrylindenyl) zirconium dichloride dimethylsilanediylbis(2-ethyl-4-phenanthrylindenyl) zirconium dichloride methyl(phenyl)silanediylbis(2-methyl-4-phenylindenyl) zirconium dichloride methyl(phenyl)silanediylbis(2-methyl-4,6-diisopropylindenyl)-zirconium dichloride methyl(phenyl)silanediylbis(2-methyl-4-isopropylindenyl)-zirconium dichloride methyl(phenyl)silanediylbis(2-methyl-4,5-benzoindenyl) zirconium dichloride methyl(phenyl)silanediylbis(2-methyl-4,5-(methylbenzo)indenyl)-zirconium dichloride methyl(phenyl)silanediylbis(2-methyl-4,5-(tetramethylbenzo)-indenyl)zirconium dichloride methyl(phenyl)silanediylbis(2-methyl-4-α-acenaphthindenyl)-zirconium dichloride methyl(phenyl)silanediylbis(2-methylindenyl)zirconium dichloride methyl(phenyl)silanediylbis(2-methyl-5-isobutylindenyl) zirconium dichloride methyl(phenyl)silanediylbis(2-methyl-4-phenanthrylindenyl)-zirconium dichloride methyl(phenyl)silanediylbis(2-ethyl-4-phenanthrylindenyl)-zirconium dichloride 1,2-ethanediylbis(2-methyl-4-phenylindenyl)zirconium dichloride 1,4-butanediylbis(2-methyl-4-phenylindenyl)zirconium dichloride 1,2-ethanediylbis(2-methyl-4,6-diisopropylindenyl) zirconium dichloride 1,4-butanediylbis(2-methyl-4-isopropylindenyl) zirconium dichloride 1,4-butanediylbis(2-methyl-4,5-benzoindenyl)zirconium dichloride 1,2-ethanediylbis(2-methyl-4,5-benzoindenyl)zirconium dichloride 1,2-ethanediylbis(2,4,7-trimethylindenyl)zirconium dichloride 1,2-ethanediylbis(2-methylindenyl)zirconium dichloride 1,4-butanediylbis(2-methylindenyl)zirconium dichloride dimethylsilanediyl(tert-butylamino)(tetramethylcyclopentadienyl)-zirconium dichloride

[tris(pentafluorophenyl)(cyclopentadienylidene)borato](cyclo-pentadienyl)-1,2,3,4-tetraphenylbuta-1,3-dienylzirconium dimethylsilanediyl [tris(pentafluorophenyl)(2-methyl-4-phenyl-indenylidene)borato](2-methyl-4-phenylindenyl)-1,2,3,4-tetra-phenylbuta-1,3-dienylzirconium dimethylsilanediyl [tris(trifluoromethyl)(2-methylbenzoindenyl-idene)borato](2-methylbenzindenyl)-1,2,3,4-tetraphenylbuta-1,3-dienylzirconium dimethylsilanediyl [tris(pentafluorophenyl)(2-methylindenyl-idene)borato](2-methylindenyl)-1,2,3,4-tetraphenylbuta-1,3-dienylzirconium dimethylsilanediylbis(indenyl)dimethylzirconium dimethylsilanediylbis(4-naphthylindenyl) dimethylzirconium dimethylsilanediylbis(2-methylbenzoindenyl) dimethylzirconium dimethylsilanediylbis(2-methylindenyl) dimethylzirconium dimethylsilanediylbis(2-methyl-4-(1-naphthyl)indenyl) dimethyl-zirconium dimethylsilanediylbis(2-methyl-4-(2-naphthyl)indenyl) dimethyl-zirconium dimethylsilanediylbis(2-methyl-4-phenylindenyl) dimethylzirconium dimethylsilanediylbis(2-methyl-4-t-butylindenyl) dimethylzirconium dimethylsilanediylbis(2-methyl-4-isopropylindenyl) dimethyl-zirconium dimethylsilanediylbis(2-methyl-4-ethylindenyl) dimethylzirconium dimethylsilanediylbis(2-methyl-4-α-acenaphthindenyl) dimethyl-zirconium dimethylsilanediylbis(2,4-dimethylindenyl) dimethylzirconium dimethylsilanediylbis(2-ethylindenyl)dimethylzirconium dimethylsilanediylbis(2-ethyl-4-ethylindenyl) dimethylzirconium dimethylsilanediylbis(2-ethyl-4-phenylindenyl) dimethylzirconium dimethylsilanediylbis(2-methyl-4,5-benzoindenyl) dimethylzirconium dimethylsilanediylbis(2-methyl-4,6-diisopropylindenyl) dimethyl-zirconium dimethylsilanediylbis(2-methyl-4,5-diisopropylindenyl) dimethyl-zirconium dimethylsilanediylbis(2,4,6-trimethylindenyl) dimethylzirconium dimethylsilanediylbis(2,5,6-trimethylindenyl) dimethylzirconium dimethylsilanediylbis(2,4,7-trimethylindenyl) dimethylzirconium dimethylsilanediylbis(2-methyl-5-isobutylindenyl) dimethyl-zirconium dimethylsilanediylbis(2-methyl-5-t-butylindenyl) dimethylzirconium dimethylsilanediylbis(2-methyl-4-phenanthrylindenyl) dimethyl-zirconium dimethylsilanediylbis(2-ethyl-4-phenanthrylindenyl) dimethyl-zirconium methyl(phenyl)silanediylbis(2-methyl-4-phenylindenyl) dimethyl-zirconium methyl(phenyl)silanediylbis(2-methyl-4,6-diisopropylindenyl)-dimethylzirconium methyl(phenyl)silanediylbis(2-methyl-4-isopropylindenyl)dimethyl-zirconium
methyl(phenyl)silanediylbis(2-methyl-4,5-benzoindenyl)dimethyl-zirconium
methyl(phenyl)silanediylbis(2-methyl-4,5-(methylbenzo)indenyl)-dimethylzirconium
methyl(phenyl)silanediylbis(2-methyl-4,5-(tetramethylbenzo)-indenyl)dimethylzirconium
methyl(phenyl)silanediylbis(2-methyl-4-α-acenaphthindenyl)-dimethylzirconium
methyl(phenyl)silanediylbis(2-methylindenyl)dimethylzirconium
methyl(phenyl)silanediylbis(2-methyl-5-isobutylindenyl)dimethyl-zirconium
methyl(phenyl)silanediylbis(2-methyl-4-phenanthrylindenyl)-dimethylzirconium
methyl(phenyl)silanediylbis(2-ethyl-4-phenanthrylindenyl)-dimethylzirconium
1,2-ethanediylbis(2-methyl-4-phenylindenyl)dimethylzirconium
1,2-butanediylbis(2-methyl-4-phenylindenyl)dimethylzirconium
1,2-ethanediylbis(2-methyl-4,6-diisopropylindenyl)dimethyl-zirconium
1,4-butanediylbis(2-methyl-4-isopropylindenyl)dimethylzirconium
1,4-butanediylbis(2-methyl-4,5-benzoindenyl)dimethylzirconium
1,2-ethanediylbis(2-methyl-4,5-benzoindenyl)dimethylzirconium
1,2-ethanediylbis(2,4,7-trimethylindenyl)dimethylzirconium
1,4-butanediylbis(2-methylindenyl)dimethylzirconium Very particular preference is given to:
dimethylsilanediylbis(2-methylindenyl)zirconium dichloride
dimethylsilanediylbis(2-methyl-4-isopropylindenyl)zirconium dichloride
dimethylsilanediylbis(2-methyl-4-(1-naphthyl)indenyl)zirconium dichloride
dimethylsilanediylbis(2-methyl-4-phenylindenyl)zirconium dichloride
dimethylsilanediylbis(2-methyl-4-(para-t-butylphenyl)indenyl)-zirconium dichloride
dimethylsilanediylbis(2-methyl-4-α-acenaphthindenyl)zirconium dichloride
dimethylsilanediylbis(2-ethyl-4-phenylindenyl)zirconium dichloride
dimethylsilanediylbis(2-methyl-4,5-benzoindenyl)zirconium dichloride
dimethylsilanediylbis(2-methyl-4,6-diisopropylindenyl)zirconium dichloride
dimethylsilanediylbis(2-methyl-4-phenanthrylindenyl)zirconium dichloride
dimethylsilanediylbis(2-ethyl-4-phenanthrylindenyl)zirconium dichloride
methyl(phenyl)silanediylbis(2-methyl-4-phenanthrylindenyl)-zirconium dichloride
methyl(phenyl)silanediylbis(2-ethyl-4-phenanthrylindenyl)-zirconium dichloride
dimethylsilanediylbis(-2-methyl-4-(para-4-butyl)phenylindenyl)zirconium dichloride, and also the corresponding dimethylzirconium compounds.

Particularly useful compounds of the formula M-IId are those in which
M is titanium or zirconium,
X is chlorine, $C_1$–$C_4$-alkyl or phenyl,
$R^{15}$ is

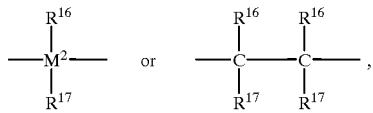

A is

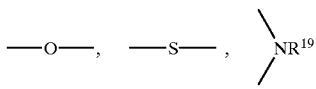

and
$R^1$ to $R^3$ and $R^5$ are hydrogen, $C_1$–$C_{10}$-alkyl, $C_3$–$C_{10}$-cycloalkyl, $C_6$–$C_{15}$-aryl or Si($R^8$)$_3$, or two adjacent radicals form a cyclic group having from 4 to 12 carbon atoms.

Such complexes can be synthesized by methods known per se, with preference being given to the reaction of appropriately substituted, cyclic hydrocarbon anions with halides of titanium, zirconium, hafnium, vanadium, niobium or tantalum.

Examples of appropriate preparative methods are described, for example, in Journal of Organometallic Chemistry, 369 (1989), 359–370.

It is also possible to use mixtures of various metal complexes M-II.

The cation-forming compound B) is generally a strong Lewis acid (electrically neutral or positively charged) or a Brönsted acid and/or an aluminoxane of the formula V or VI, with preference being given to strong Lewis acids (electrically neutral or positively charged) or Brönsted acids,

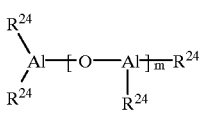

V

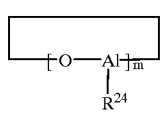

VI where $R^{24}$ is a $C_1$–$C_4$-alkyl group, preferably a methyl or ethyl group, and m is a integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably aluminum alkyls.

It is also possible to use aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof.

It has been found to be advantageous to use the transition metal compound A) and the oligomeric aluminoxane compound in such amounts that the atomic ratio between aluminum from the oligomeric aluminoxane compound and the transition metal from the transition metal compound A is in the range from 1:1 to $10^6:1$, preferably from 1:1 to $10^4:1$, in particular from 1:1 to 10:1.

Preferred uncharged Lewis acids are ones which form a nonnucleophilic anion after the reaction with the transition metal component A). Preferred positively charged Lewis acids and Brönsted acids are ones which have a nonnucleophilic conjugated anion.

Strong, uncharged Lewis acids as component B) are compounds of the formula II $$M^3X^1X^2X^3 \qquad \qquad II$$

where

M³ is an element of main group III of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula II in which $X^1$, $X^2$ and $X^3$ are identical, for example trifluoroborane, triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-dimethylfluorophenyl)borane and/or tris(3,4,5-trifluorophenyl)borane. Particular preference is given to tris(pentafluorophenyl)borane.

Ionic compounds as component B) having strong Lewis-acid cations are compounds of the formula III $$[(Y^{a+})Q_1Q_2 \ldots Q_z]^{d+} \qquad \qquad III$$

where

Y is an element of main groups I to VI or transition groups I to VIII of the Periodic Table, $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$–$C_{10}$-cycloalkyl which may in turn bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6 and z is an integer from 0 to 5, d corresponds to the difference a–z, but d is greater than or identical to 1.

Particularly useful Lewis-acid cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are mentioned in WO 91/09882, preferably tetrakis(pentafluorophenyl)borate. Examples which may be mentioned are triphenylcarbenium tetrakis(pentafluorophenyl)borate, triphenylcarbenium tetrakis(pentafluorophenyl)aluminate, triphenylcarbenium tetrakis(phenyl)aluminate, ferrocenium tetrakis(pentafluorophenyl)borate and/or ferrocenium tetrakis(pentafluorophenyl)aluminate.

Particularly preferred compounds as component B) are ionic compounds having Brönsted acids as cations and preferably noncoordinating counterions, as mentioned in WO 91/09882; the preferred cation is N,N-dimethylanilinium. Examples which may be mentioned are triethylammonium tetra(phenyl)borate, tributylammonium tetra(phenyl)borate, trimethylammonium tetra(tolyl)borate, tributylammonium tetra(tolyl)borate, tributylammonium tetra(pentafluorophenyl)borate, tributylammonium tetra(pentafluorophenyl)aluminate, tripropylammonium tetra(dimethylphenyl)borate, tributylammonium tetra(trifluoromethylphenyl)borate, tributylammonium tetra(4-fluorophenyl)borate, N,N-dimethylanilinium tetra-(phenyl)borate, N,N-diethylanilinium tetra(phenyl)borate, N,N-dimethylanilinium tetrakis(pentafluorophenyl)borate, N,N-dimethylanilinium tetrakis(pentafluorophenyl)aluminate, di(propyl)ammonium tetrakis(pentafluorophenyl)borate, di(cyclohexyl)ammonium tetrakis(pentafluorophenyl)borate, triphenylphosphonium tetrakis(phenyl)borate, triethylphosphonium tetrakis(phenyl)borate, diphenylphosphonium tetrakis(phenyl)borate, tri(methylphenyl)phosphonium tetrakis(phenyl)borate, tri(dimethylphenyl)phosphonium tetrakis(phenyl)borate.

Other suitable components B) are borane or carborane compounds such as 7,8-dicarbaundecaborane(13), undecahydrido-7,8-dimethyl-7,8-dicarbaundecaborane, dodecahydrido-1-phenyl-1,3-dicarbaundecaborane, tri(butyl)ammonium decahydrido-8-ethyl-7,9-dicarbaundecaborate, 4-carbanonaborane(14), bis(tri(butyl)ammonium)nonaborate, bis(tri(butyl)ammonium) undecaborate, bis(tri(butyl)ammonium)dodecaborate, bis(tri(butyl)ammonium) decachlorodecaborate, tri(butyl)ammonium 1-carbadecaborate, tri(butyl)ammonium 1-carbadodecaborate, tri(butyl)ammonium 1-trimethylsilyl-1-carbadecaborate, tri(butyl)ammonium bis(nonahydrido-1,3-dicarbanonaborato)cobaltate (III), tri(butyl)ammonium bis(undecahydrido-7,8-dicarbaundecaborato)ferrate (III).

Of course, it is also possible to use mixtures of the above-described compounds (strong uncharged and ionic Lewis acids and boranes or carboranes) or part of these compounds as component B), in which case the mixing ratio is not critical.

The molar ratio of transition metal compound A): cation-forming compound B) apart from aluminoxanes is from 1:1 to 1:10, preferably from 1:1 to 1:5.

The catalyst system of the present invention may further comprise, as component C), an organometallic compound, preferably a metal compound of the formula IV $$M^1 (R^{21})_r (R^{22})_s (R^{23})_t \qquad \qquad IV$$

where $M^1$ is an alkali metal, an alkaline earth metal or a metal of main group III of the Periodic Table, i.e. boron, aluminum, gallium, indium or thallium, $R^{21}$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $R^{22}$ and $R^{23}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of $M^1$.

If the component C) is present together with A) and/or B), it is in this case not identical to the components A) and in particular B).

Among the metal compounds of the formula IV, preference is given to those in which $M^1$ is lithium, magnesium or aluminum and $R^{21}$ to $R^{23}$ are $C_1$–$C_{10}$-alkyl.

Particularly preferred metal compounds of the formula IV are n-butyllithium, n-butyl-n-octylmagnesium, n-butyl-n-heptylmagnesium, tri-n-hexylaluminum, triisobutylaluminum, triethylaluminum and trimethylaluminum.

If compounds IV are used, they are preferably present in the catalyst system in an amount of from 800:1 to 1:1, in particular from 500:1 to 50:1 (molar ratio of $M^1$ from IV to transition metal M from I).

The catalyst system can also contain emulsifiers and/or protective colloids as further components C).

Preferred emulsifiers are nonionic emulsifiers, e.g. Emulane® 825 PO, Emulan® NP 20, Emulan® NP 50, Emulan® OG, Emulan® OP 25, Emulan® OU, Emulan® TO 30, Lutensol® AT 18, Lutensol® RO 89, Pluriol®E 1000, Pluriol® P 2000, Pluronic® PE 4300, Pluronic® PE 6800, Pluronic® PE 8100 and Siligen® FA, and cationic emulsifiers, e.g. dodecyltrimethylammonium chloride, Basacrylsalz AN and Basacrylsalz KM and also cetyltrimethylammonium bromide and benzethonium chloride. Protective colloids are preferably nonionic or cationic, particularly preferably ones based on polyvinyl alcohol, e.g. Protectol KLC 50.

The process of the present invention is used for the polymerization of cyclic or noncyclic monomers having a C—C double bond or C—C triple bond. The C—C double bond or the C—C triple bond or both can be either terminal or internal, either exocyclic or endocyclic. Preferred monomers having a C—C triple bond are $C_2$–$C_{10}$-alk-1-ynes, such as ethyne, propyne, 1-butyne, 1-hexyne and also phenylacetylene. The polymerization process of the present invention is preferably used for polymerizing or copolymerizing $C_2$–$C_{12}$-alk-1-enes or $C_4$–$C_{10}$-dienes, such as 1,3-butadiene, 1,5-hexadiene or $C_5$–$C_{10}$-cyclic dienes such as norbornadiene, cyclopentadiene. As $C_2$–$C_{12}$-alk-1-enes, preference is given to ethylene, propylene, 1-butene, 1-pentene, 4-methyl-1-pentene, 1-hexene, 1-heptene or 1-octene or vinylaromatic monomers such as styrene, p-methylstyrene or 2,4-dimethylstyrene or mixtures of these $C_2$–$C_{12}$-alk-1-enes. Particular preference is given to homopolymers or copolymers of ethylene or of propylene, with the proportion of ethylene or of propylene in the copolymers being at least 50 mol %. Among the copolymers of ethylene, preference is given to those containing propylene, 1-butene, 1-hexene or 1-octene or mixtures thereof as further monomers. Among the copolymers of propylene, particular preference is given to copolymers in which the further monomers are ethylene or 1-butene or mixtures thereof.

The polymerization process of the present invention is preferably employed for preparing polymers comprising from 50 to 100 mol % of ethylene and from 0 to 50 mol %, in particular from 0 to 30 mol %, of $C_3$–$C_{12}$-alk-1-enes.

Preference is also given to polymers comprising from 50 to 100 mol % of propylene, from 0 to 50 mol %, in particular from 0 to 30 mol %, of ethylene and from 0 to 20 mol %, in particular from 0 to 10 mol %, of $C_4$–$C_{12}$-alk-1-enes.

The total amount of mol % is 100.

Particular preference is also given to polymers of vinylaromatic compounds of the formula V-I

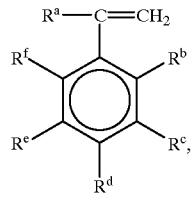

(V-I)

where the substituents have the following meanings:

$R^a$ is hydrogen or $C_1$–$C_4$-alkyl, $R^b$ to $R^f$ are, independently of one another, hydrogen, $C_1$–$C_{12}$-alkyl, $C_6$–$C_{18}$-aryl, halogen or two adjacent radicals may together form a cyclic group having from 4 to 15 carbon atoms, for example $C_4$–$C_8$-cycloalkyl or fused-on ring systems.

Preference is given to using vinylaromatic compounds of the formula V-I in which $R^a$ is hydrogen.

Suitable substituents $R^b$ to $R^f$ are, in particular, hydrogen, $C_1$–$C_4$-alkyl, chlorine or phenyl, biphenyl, naphthalene or anthracene. Two adjacent radicals may also together form a cyclic group having from 4 to 12 carbon atoms, so as to give, for example, naphthalene derivatives or anthracene derivatives as compounds of the formula V-I.

Examples of such preferred compounds are:

styrene, p-methylstyrene, p-chlorostyrene, 2,4-dimethylstyrene, 4-vinylbiphenyl, 2-vinylnaphthalene and 9-vinylanthracene.

It is also possible to use mixtures of various vinylaromatic compounds, where one component may also bear further hydrocarbon radicals such as vinyl groups, allyl groups, methallyl groups, butenyl or pentenyl groups, preferably vinyl groups, on the phenyl ring. However, preference is given to using only one vinylaromatic compound.

Particularly preferred vinylaromatic compounds are styrene and p-methylstyrene.

The vinylaromatic compounds of the formula V-I, preferably styrene, can also be copolymerized with $C_2$–$C_{12}$-alk-1-enes and/or $C_2$–$C_{10}$-alk-1-ynes.

Very particularly preferred vinylaromatic polymers are syndiotactic homopolystyrene ($\geq$70% of rr triads, determined by $^{13}$C-NMR spectroscopy) or styrene- $C_2$–$C_{12}$-alk-1-ene copolymers having syndiotactic styrene units, with preference being given to using ethylene and/or propylene and/or 1-butene as 1-alkene comonomers.

The polymerization of the above-described monomers usually takes place in a water-containing, liquid polymerization mixture. For the purposes of the present invention, this is a mixture of water, monomer, catalyst system, if desired organic solvent or suspension medium or further additives such as those of component C).

The water content of the polymerization mixture is at least 30% by weight, preferably from 35 to 90% by weight and in particular from 40 to 70% by weight, based on the polymerization mixture.

The polymerization can be carried out by the customary methods for olefin polymerization in a liquid phase, for example solution or suspension polymerization, continuously or batchwise.

Suitable organic solvents or suspension media are aliphatic, cycloaliphatic or aromatic hydrocarbons, which may also be halogenated, also ethers, esters and ketones.

Well-suited organic solvents are $C_6$–$C_{20}$-aromatics such as toluene, ethylbenzene, meta-, ortho- or para-xylene, $C_5$–$C_{10}$-aliphatics such as n-pentane, n-hexane or n-heptane, $C_3$–$C_{20}$-ketones such as acetone, ethyl methyl ketone or diethyl ketone, $C_3$–$C_{20}$-esters such as ethyl acetate, or $C_1$–$C_{10}$-haloalkanes such as methylene chloride or 1,1,1-trichloroethane.

The preferred organic solvent is toluene.

The organic solvents can also be used as mixtures. The amount of the abovementioned organic solvents present in the polymerization mixture is generally from 0 to 70% by weight and preferably from 0 to 50% by weight, based on the polymerization mixture.

Well-suited polymerization methods are the following:

A mixture of polymerization catalyst, i.e. M-II and, if desired, B) and/or C), and monomer and, if desired, organic solvent (hereinafter referred to as mixture No. 1) is added to a mixture of water, emulsifier and/or protective colloid (hereinafter referred to as mixture No. 2).

The mixture No. 1 is preferably left for from 0.1 to 10 minutes at from 60 to 100° C. before it is added, preferably while stirring, to the aqueous mixture No. 2.

The addition of the mixture No. 1 to the mixture No. 2 is usually carried out at from 20 to 150° C., preferably up to 150° C., particularly preferably from 80 to 150° C., while the polymerization itself is generally carried out at from 20 to 100° C., preferably from 60 to 100° C., particularly preferably from 80 to 100° C. The addition of the mixture No. 1 to the mixture No. 2 is preferably carried out sufficiently quickly to avoid any crystallization which could interfere with or prevent the formation of an emulsion. Emulsion formation can also be aided by use of a high-pressure homogenizer or ultrasound so as to obtain particularly fine droplets. This can occur in the mixture No. 2 before, during or after addition of the mixture No. 1. The polymerization variant employed is not critical, and it is possible to carry out suspension polymerizations, emulsion polymerizations including miniemulsion polymerizations and microemulsion polymerizations. Preference is given to emulsion polymerization.

In the process of the present invention, aqueous polymerization dispersions or polymer suspensions are initially obtained.

The particle sizes of the polymers in these dispersions are in the range from 10 to 1000 nm, preferably from 50 to 500 nm, in particular from 100 to 300 nm.

The particle sizes in these suspensions are in the range from 50 to 1000 μm.

The polymer particles can be obtained as such from the initially obtained aqueous dispersions/suspensions by removal of the water and, if necessary, of the organic solvent. The removal of the liquid components from the dispersion/suspension can be carried out using all customary methods, preferably filtration, spray drying or evaporation of the liquids.

The polymers obtained in this way have a good morphology and a high bulk density.

The dispersions of the present invention can advantageously be used in numerous applications, for example paper applications such as paper coating or surface sizing, also paints and varnishes, building chemicals, adhesives raw materials, molded foams, textile and leather treatment compositions, carpet reverse coatings, mattresses or pharmaceutical preparations.

For the purposes of the present invention, paper coating is the coating of the paper surface with aqueous pigmented dispersions. The dispersions of the present invention are advantageous for this purpose because of their favorable price. Surface sizing is the application of pigment-free, hydrophobicizing substances. Here, the polyolefin dispersions which have hitherto been obtainable only with difficulty under economical conditions are especially advantageous as particularly hydrophobic substances. A further advantage is that no molar mass regulator such as tert-dodecyl mercaptan has to be added during the preparation of the dispersions of the present invention for paper coating or surface sizing; such molar mass regulators are difficult to separate off and have an unpleasant odor.

In paints and varnishes, the dispersions of the present invention are particularly useful because they have a very favorable price. Aqueous polyethylene dispersions are particularly advantageous because they additionally have a particularly good UV stability. Aqueous polyethylene dispersions are also particularly suitable because they are resistant to basic materials such as cement which are customary in building products.

In adhesives, particularly in adhesives for self-adhesives labels or films and also sticking plasters, but also in building adhesives or industrial adhesives, the dispersions of the present invention have economic advantages. Particularly in building adhesives, they are particularly useful because they are resistant to basic materials as are customary in building products.

In molded foams which can be produced from the dispersions of the present invention by methods known per se, e.g. the Dunlop process or the Talalay process, the favorable price of the dispersions of the present invention is once again advantageous. Further components used are gelling agents, soaps, thickeners and vulcanization pastes. Molded foams are, for example, processed to produce mattresses.

Textile and leather treatment compositions serve to preserve and upgrade textiles or leather. Examples of treatments are impregnation and further finishing of textiles. Advantages of the dispersions of the present invention as constituents of textile and leather treatment compositions are the favorable price and also their freedom from odor, since olefins as residual monomers can be removed easily.

Carpet reverse coatings serve to adhesively bond the carpet fibers on the reverse side, and also have the task of giving the carpet the necessary stiffness and to distribute additives such as flame retardants or antistatics uniformly. Advantages of the dispersions of the present invention are the favorable price and the insensitivity toward customary additives. The polyethylene dispersions of the present invention have been found to be particularly inert chemically. A further advantage is that no molar mass regulators such as tert-dodecyl mercaptan, which are difficult to separate off and have an unpleasant odor, have to be added during the preparation of the dispersions of the present invention for carpet reverse coatings. Finally, carpets containing the carpet reverse coatings of the present invention can readily be recycled.

For the purposes of the present invention, pharmaceutical preparations are dispersions as carriers of drugs. Dispersions as carriers of drugs are known per se. Advantages of the dispersions of the present invention as carriers of drugs are the economically favorable price and the resistance toward influences in the body, e.g. digestive juices or enzymes.

EXAMPLES

The particle size of the suspension particles was measured using a scanning electron microscope. The mean particle diameter was determined with the aid of an image analyzer via the object-specific area and determination of the diameter of the area-equivalent circle.

The particle size of the dispersion was measured by light scattering. There is no definitive standard for this method; a description may be found, for example, in D. Distler (Editor), "WäBrige Polymerdispersion", Wiley-VCH, Weinheim, 1999, Chapter 4. The instrument used is a Malvern Autosizer IIC, automated with flow cell and Gilson autosampler. The measurement conditions are: measurement temperature: 23.0° C., measurement time: 200 seconds (10 cycles of 20 s), scattering angle: 90° and wavelength of the laser: 633 nm (HeNe).

The NMR instrument used is a Bruker DPX 250 (solvent: $CD_2Cl_4$ at 120° C.).

The DSC curves were measured using a Seiko Instruments DSC 6200 R. The sample weight was about 8 mg and the heating rate was 20 K/min. The sample was measured in the as-supplied state (1st run) and after rapid cooling from 300° C. (2nd run). The glass transition temperature was measured as the midpoint glass transition temperature. The DSC measurements were carried out using a method based on DIN 53765.

EXAMPLE 1

Polymerization of styrene in the presence of water

In a feed stream vessel, 75 g of styrene were dissolved in 300 g of toluene and heated to 80° C. 9.5 g of 25% triisobutylaluminum (TiBA) in toluene were then added. Separately from this, 0.385 g of N,N-dimethylanilinium tetrakis(pentafluorophenyl)borate and 0.135 g of pentamethylcyclopentadienyltitanium trimethoxide were dissolved in 10 ml of toluene. This mixture was metered into the feed stream vessel only after addition of the TiBA. After 0.5 minutes, this mixture was added to an emulsion of 18.75 g of 20% Lutensol AT 18 in 300 g of deionized water. After one hour, the reaction was stopped by means of ethanol. The suspension was dried under reduced pressure at 80° C.

Yield: 66%

Melting point: 269° C.

Particle size: 500 μm

EXAMPLE 2

Polymerization in the presence of water

In the reactor, 20 g of styrene were dissolved in 77 g of toluene and heated to 80° C. 2.5 g of 25% triisobutylaluminum (TiBA) in toluene were then added. Separately from this, 0.1 g of N,N-dimethylanilinium tetrakis(pentafluorophenyl)borate and 0.035 g of pentamethylcyclopentadienyltitanium trimethoxide were dissolved in 10 ml of toluene. This mixture was metered into the reactor only after the addition of the TiBA. After 5 minutes, a mixture of 96.5 g of cetyltrimethylammonium bromide in 1286 g of water, which had been heated to 80° C., was added. After one hour, the reaction was stopped by means of ethanol. This gave a dispersion having a mean particle size of 70 nm. A conversion of 62% was determined.

We claim:

1. A process for preparing polymers based on monomers having a C—C double bond and/or C—C triple bond by polymerization of a polymerization mixture of these monomers and a catalyst system comprising as active constituents A) a transition metal compound of an early transition metal (M-II)

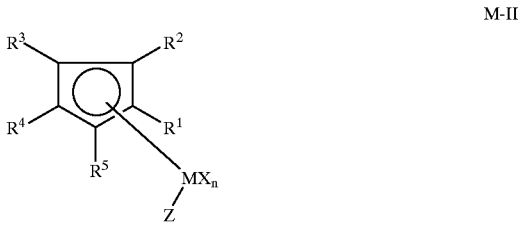

where the substituents and indices have the following meanings:

M is titanium, zirconium, hafnium, vanadium, niobium or tantalum, or an element of transition group III of the Periodic Table and the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, $N(CH_2CH_2O)_3$, n is an integer from 1 to 3 corresponding to the valence of M minus 2, where $R^6$ and $R^7$ are hydrogen, $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^8)_3$ where $R^8$ is $C_1$–$C_{10}$-alkyl, $C_3$–$C_{10}$-cycloalkyl or $C_6$–$C_{15}$-aryl, Z is X or

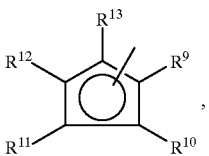

where the radicals $R^9$ to $R^{13}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl and two adjacent radicals may also together form a saturated or unsaturated cyclic group having from 4 to 15 carbon atoms, or $Si(R^{14})_3$ where $R^{14}$ is $C_1$–$C_{10}$-alkyl, $C_6$–$C_{15}$-aryl or $C_3$–$C_{10}$-cycloalkyl, or the radicals $R^4$ and Z together form an —$R^{15}$—A— group, where

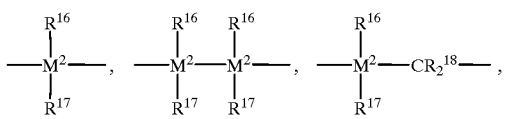

-continued

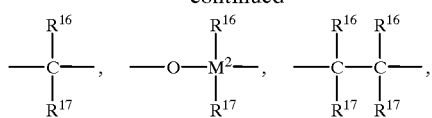

$=BR^{16}$, $=AlR^{16}$, —Ge—, —Sn—, —O—, —S—, =SO, $=SO_2$, $=NR^{16}$, =CO, $=PR^{16}$ or $=P(O)R^{16}$, where $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them may form a ring, and $M^2$ is silicon, germanium or tin, A is

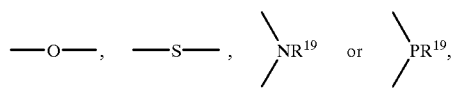

where $R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^4$ and $R^{12}$ together form an —$R^{15}$— group, a cation-forming compound B) and, optionally, at least emulsifiers and/or protective colloids as further components C), wherein the polymerization mixture contains at least 30% by weight of water.

2. The process of claim 1, wherein the transition metal compound M-II is mixed firstly with the cation-forming compound B) and then with the other reaction components.

3. The process of claim 1, wherein the transition metal compound M-II is firstly mixed with the cation-forming compound B), this mixture is added to a mixture of the monomer or monomers and, if desired, further component(s) C) and the resulting mixture, which contains virtually no water, is added after from 0.1 to 10 minutes to a liquid phase comprising at least 90% by weight, based on the liquid phase, of water and, optionally, emulsifiers and/or protective colloids as further components C).

4. The process of claim 1, wherein further components C) are used and comprise at least emulsifiers and/or protective colloids.

5. The process of claim 1, wherein component C is present as uncharged or cationic emulsifiers and/or protective colloids.

6. The process of claim 1, wherein the monomers used are $C_2$–$C_{20}$-alk-1-enes and/or cyclic and/or noncyclic $C_4$–$C_{10}$-dienes and/or $C_8$–$C_{20}$-vinylaromatic compounds.

7. An aqueous dispersion or suspension based on monomers having C—C double bond and/or C—C triple bond, obtained by the process defined in claim 1.

8. An aqueous dispersion or suspension as defined in claim 7, wherein the monomers used are $C_8$–$C_{20}$-vinylaromatic compounds.

9. A polymer obtained from an aqueous dispersion or suspension as defined in claim 7 by removing the water from this dispersion or suspension.

* * * * *

UNITED STATES PATENT AND TRADEMARK OFFICE
CERTIFICATE OF CORRECTION

PATENT NO.    : 6,506,856 B2
DATED         : January 14, 2003
INVENTOR(S)   : Manders et al.

It is certified that error appears in the above-identified patent and that said Letters Patent is hereby corrected as shown below:

Column 18,
Line 64, before the formulae, insert -- $R^{15}$ is --.

Signed and Sealed this

Twenty-seventh Day of May, 2003

JAMES E. ROGAN
*Director of the United States Patent and Trademark Office*